Jan. 25, 1955   L. E. ROVNER   2,700,221
HYPERBOLOGRAPH INSTRUMENT
Filed Jan. 8, 1946   2 Sheets-Sheet 2

INVENTOR
LEOPOLD E. ROVNER
BY M. O. Hayes
ATTORNEY

United States Patent Office 2,700,221
Patented Jan. 25, 1955

2,700,221

HYPERBOLOGRAPH INSTRUMENT

Leopold E. Rovner, Cambridge, Mass., assignor, by mesne assignments, to the United States of America as represented by the Secretary of the Navy Application January 8, 1946, Serial No. 639,897

7 Claims. (Cl. 33—27)

This invention relates to instruments for drawing conic sections and more particularly to instruments for drawing confocal plane hyperbolas.

In certain methods of navigation, the lines of position may effectively be considered families of plane hyperbolas. Since a tremendous number of man-hours of effort is required to draw point-by-point the confocal hyperbola patterns of this system of lines of position, an instrument for rapidly drawing these patterns on navigation charts is desirable.

Various devices for drawing hyperbolas, called hyperbolograph instruments, have been developed, but none of these instruments has achieved sufficient solution of inherent problems in the art so that they are capable of drawing selected curves within the close tolerances required in position-indicating systems. Past devices have been chiefly for the purpose of demonstration in explaining some concepts in the instrumentation of hyperbola drawing. Although not a quantitative machine, a cord device suggested by R. M. Sutton in an article in the "American Mathematics Monthly" April 1943, page 253, is typical of prior means for drawing hyperbolas known to those skilled in the art. In this device, cords, which are wound around opposite ends of a roller, are connected to a piece of chalk through small eyelets located at points which are fixed relative to a plane surface and which represent the foci of the hyperbola which is to be drawn on this surface. If the chalk is moved away from a line connecting the foci, called the base line, against the tension produced by a coil spring attached to the roller, and if both cords are kept taut, the chalk will move along the path of a hyperbola. The eccentricity of the curve can be selected by shifting the chalk along the cord (changing the relative lengths of the focal radii) and thus the family of confocal hyperbolas can be drawn in rapid succession.

This device operates according to the well-known geometric property of a plane hyperbola that the hyperbola is the locus of a point in a plane moving such that the difference of its distances from two other points in the plane (the foci) remains constant. For this difference to remain constant, the two cords must be maintained equally taut. The fact that the operator will seldom be able to move the chalk so as to maintain exactly equal tension in the two cords accounts for the principal inaccuracies of this device. Another disadvantage is that the cords issue from different parts of the foci eyelets for different portions of the curve so that the hyperbola drawn does not have true foci. A further disadvantage is that since the two cords are of different lengths, any elongation of the cords due to tension produces an error as there is no longer a constant difference in their lengths.

The principal object of this invention is to provide improvements in hyperbolograph instruments using taut cords in order that confocal hyperbolas may be drawn rapidly within close tolerances.

Another object of this invention is to provide a cord hyperbolograph instrument in which a stylus-drag device is drawn toward the foci by two cords along a path which is the resultant of the directions of the equal tensions in the two cords.

Another object of this invention is to provide a cord hyperbolograph instrument in which setting errors caused by unequal tension in the cords is eliminated by providing gauges to indicate the cord tension.

A further object of this invention is to provide a cord hyperbolograph instrument in which the cords issue from an effective true point source.

A still further object of this invention is to provide a cord hyperbolograph instrument in which errors due to cord elongation are minimized by making the total length of each cord the same in the overall mechanism.

Other and further objects will appear during the course of the following description when taken with the accompanying drawings, in which.

The principle of the equal drag-tension cord hyperbolograph of this invention is that a stylus unit moving in toward the base line under tension of two cords, issuing as from focal points, seeks an equilibrium position such that equal tension in the two driving cords is continuously maintained by the drag action of the mechanism. The direction of the resultant motion of the stylus unit will thus always bisect the angle between the directions of the tensions in the two cords, or the angle between the focal radii. That fact that this is a necessary condition for drawing a hyperbola results from a second geometrical property of the plane hyperbola, which is that a tangent line drawn at any point on a hyperbola (that is, the direction of motion of the generating point at any position on the hyperbola) bisects the angle between the focal radii. Tension gauges such as are disclosed in the copending application of Carl K. Hansen, Phillip H. Miller and Leopold E. Rovner for a Cord Tension Indicator, Serial Number 645,623, filed February 5, 1946, are used to indicate when the tension in the two cords is equal for accurately setting the stylus unit at the start of a given curve.

To insure that the cords issue as from the focal points, a special swivel pulley arrangement is used for paying out the cord in any direction in a plane at right angles to the axis of the swivel. An appreciable length of the cord lies in close coincidence with the axis of the swivel mount and the point of perpendicular intersection of this axis with the plane of the curves being drawn (the focal point) is made to serve as the effective point source of the cord. In order to minimize errors due to elongation of the cords, they are wound on a single drum located at a position on the base line such that although there is a constant difference in the length of the cords between the focal points and the stylus, the total length of each cord between the drum and the stylus is the same.

Figure 1:
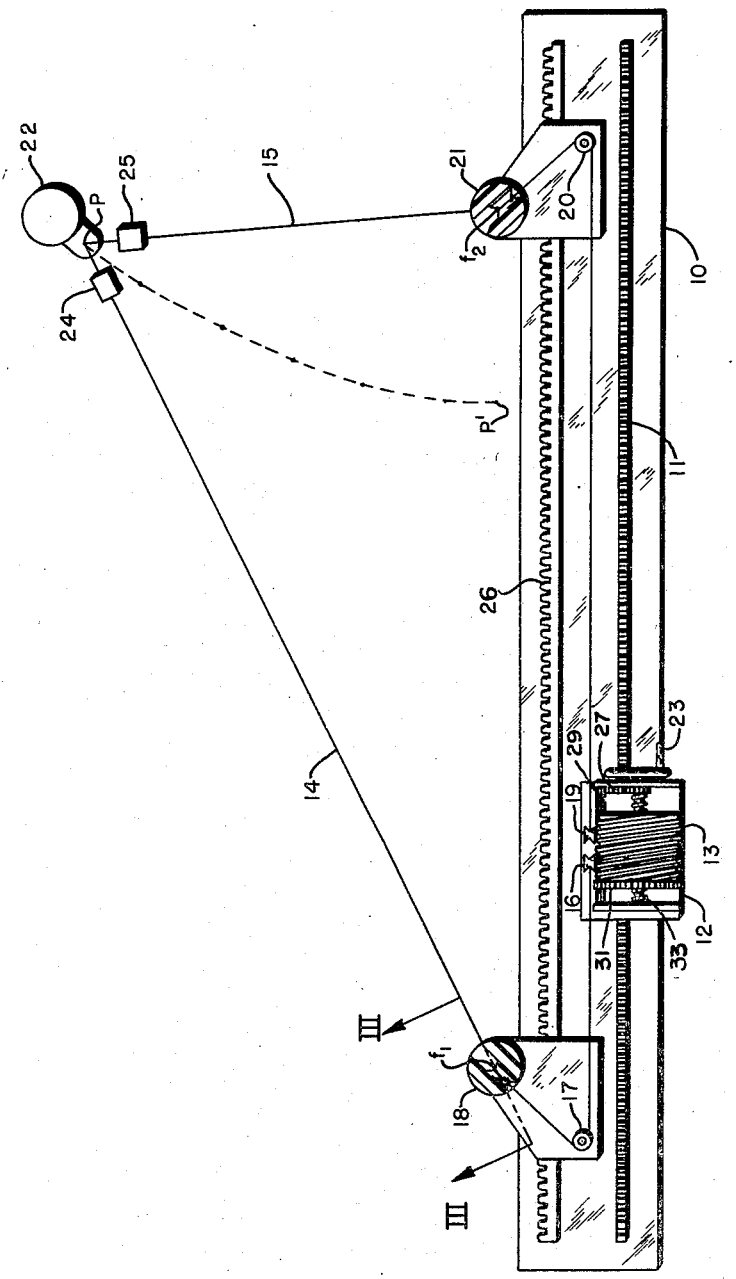
Fig. 1 is a top view of the improved cord hyperbolograph instrument.

In Fig. 1 is shown a top view of the improved hyperbolograph instrument. On a metallic base 10 is mounted a rack 11 to which is geared a carriage 12 bearing a grooved drum 13. Flexible glass cords 14 and 15 are wound in parallel helical grooves around drum 13 and pass through pulleys 16 and 17, and 19 and 20 respectively, through swivel pulleys 18 and 21 respectively, and thence to tension gauges 24 and 25 which connect them to stylus unit 22. A crank 23 is geared to drum 13 so that when it is turned the tension on cords 14 and 15 pulls stylus unit 22 toward base 10. The connection between crank 23 and drum 13 is accomplished through spur gear train 27 meshing with elongated gear member 29 which in turn meshes with gear 31 which is secured to drum 13. Drum 13 is supported for rotation on, and is internally threaded to engage, lead screw 33. Preferably the gear train 27 is chosen such that drum 13 rotates at a slower speed than the crank 23. The lead of lead screw 33 is chosen such that drum 13 is moved axially along lead screw 33 by an amount equal to the lead of the grooves on drum 13 each time drum 13 makes one complete revolution. In this manner the angle of the cords issuing from the drum with relation to the pulleys 16 and 19 remains constant and no errors are introduced in the system by the rotation of the drum. Gauges 24 and 25 indicate the amount of tension in cords 14 and 15 respectively at time of setting the stylus unit. There is a constant difference in the length of cords 14 and 15 between stylus unit 22 and swivel pulleys 18 and 21 respectively so that the curve PP' drawn by stylus 22 as it is pulled in (if there is exactly equal tension in cords 14 and 15) is a hyperbola whose foci $f_1$ and $f_2$ are at points directly beneath the swivel axis of the pulleys. Drum 13 can be moved to different positions along rack 11 to produce hyperbolas of different eccentricity. The mounts of swivel pulleys 18 and 21 are geared to rack 26 and can be adjusted for different interfocal distances. One half of each curve of a family of confocal hyperbolas is drawn with the instrument in the position shown. The instrument is rotated 180° to draw the other half of the curves. It can be seen that while the difference in the focal radii remains constant, the total length of each cord from the drum 13 and through the pulleys to stylus unit 22 is the same. As a result of the equal cord length and the fact that a cord having a very uniform load-elongation characteristic is used, differential elongation error is made very small. This hyperbolograph instrument permits proper positioning of stylus unit 22 at remote distances from the base line by indication on gauges 24 and 25 of the equal tension in each cord from the foci. Gauges 24 and 25 are located near stylus unit 22 for convenience of the stylus unit operator.

Figure 2:
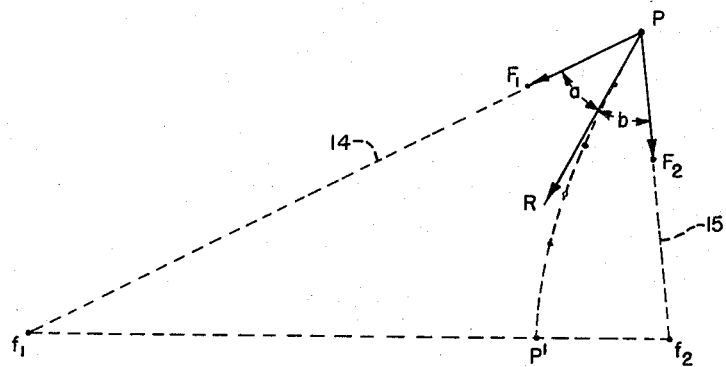
Fig. 2 is a diagram useful in explaining the principle of operation of the embodiment of Fig. 1.

In Fig. 2 is shown a diagram of the force vectors $F_1$ and $F_2$ on stylus unit 22 due to the tension in cords 14 and 15 when shortened at identically equal rates by being wound up on drum 13. The point of stylus unit 22, considered to be at point P, will move in a direction R which is the resultant of these two forces. Since $F_1$ and $F_2$ are equal, the line PR bisects the angle $F_1PF_2$. This is the condition for the motion of a point tracing a hyperbola.

Figure 3:
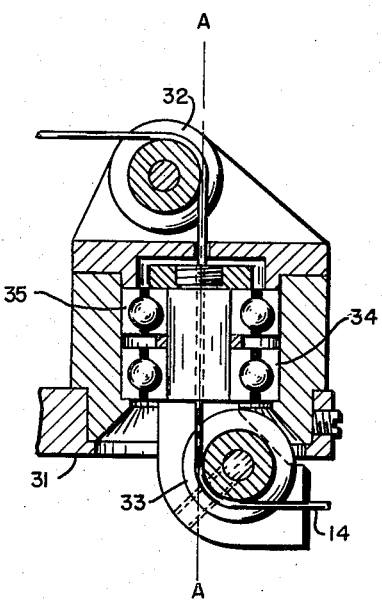
Fig. 3 is an enlarged sectional view of a portion of Fig. 1 taken along the line III—III.

Fig. 3 is an enlarged view of swivel pulley mechanism 18. On a metallic plate 31 is mounted a fixed pulley 32 and a pulley 33 which is free to swivel about a vertical axis A—A due to ball bearings 34 and 35. Cord 14 from stylus unit 22 passes around pulley 33 at right angles to the pulley axis, thence along the axis A—A of the swivel and over pulley 32 to other pulleys 16 and 17 and drum 13 of Fig. 1. The point of perpendicular intersection of the swivel axis A—A with the plane of the curves being drawn is made (by the aligning construction) to serve as the effective point source of the cord. The construction of pulley 21 is similar to that of pulley 18 and hence will not be further described.

Figure 4:
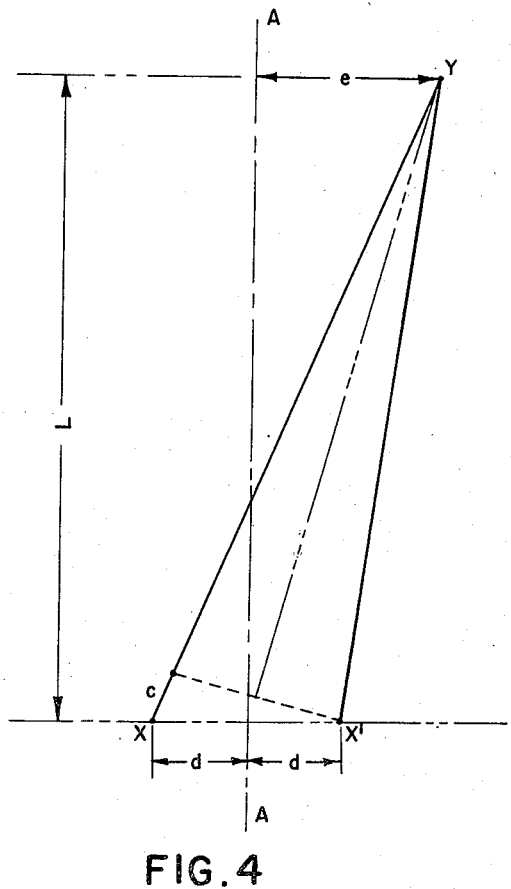
Fig. 4 is a diagram useful in explaining the embodiment of Fig. 3.

The independence of this improved pulley structure from small errors in alignment of the cord and from radial play of the shaft can be explained by reference to Fig. 4, which is an enlarged diagram of the distances along the axis A—A of Fig. 3. Points X (or X') and Y are the points of tangency of cord 14 with pulleys 33 and 32 respectively. The cord length error $c$ is due to exaggerated errors $d$ and $e$ of cord axis displacement from the true rotation axis A—A, and L is the length of the cord which passes along the axis A—A. To a sufficient approximation:

$$\frac{e}{L}=\frac{c}{2d} \text{ or } c=\frac{2de}{L}$$

If $d$ and $e$ are $\frac{1}{32}$ inch, a large and unusual error for $d$ and $e$, the error $c$ is only 0.002 inch (L is approximately 1.25 inches). Thus it can be seen for regular operating conditions that $c$ is very nearly zero and that with this mechanism the cord issues as from the axis A—A or, effectively, as from the intersecting point of this axis with a horizontal plane.

This invention is to be limited only by the appended claims.

What is claimed is:

1. In a hyperbolograph instrument, a drag device having a stylus for marking its path along a horizontal surface, a first and second flexible filament connected to said drag device, means for issuing each of said filaments as from a fixed point on said surface, means for pulling said drag device toward a base line connecting said fixed points with equal tension on said filaments, means for maintaining a constant difference in the length of said filaments between said fixed points and the stylus point of said drag device, the total effective length of said first and second filaments between said drag device and said pulling means being equal, and means for indicating the tension in said first and second filaments, whereby said drag device can be positioned correctly at a point on a hyperbola having said fixed points at its foci and moved along the true path of this hyperbola.

2. In a cord hyperbolograph instrument in which there is a constant difference between the lengths of two flexible cords between a stylus and fixed points on a horizontal surface, means for shortening said cords at equal rates, and means for maintaining the length of each of said cords equal between said stylus and said shortening means, whereby the error in stylus position due to elongation of the cords is minimized.

3. In a hyperbolograph instrument, a drag device having a stylus for marking its path along a horizontal surface, first and second flexible cords connected to said drag device, means for issuing each of said cords as from a fixed point on said surface, said fixed points being at unequal distances from said drag device, and means for shortening said first and second cords at equal rates, the length of said first and second cords from said drag device to said cord shortening means being equal, whereby said drag device moves along the path of a true hyperbola having said fixed points as its foci.

4. In a hyperbolograph instrument, a drag device having a stylus for marking its path along a horizontal surface, first and second flexible cords connected to said drag device, first and second means for issuing said first and second cords as from fixed points on said surface, each of said last-mentioned means comprising, a swivel pulley mechanism having its swivel axis at right angles to said horizontal surface, a first pulley mounted on said swivel mechanism and a second pulley mounted above said first pulley in a fixed position relative to said surface, the position of said second pulley being such that said swivel axis is approximately tangent to the periphery of said second pulley, said cord passing over said second pulley, along said swivel axis, around said first pulley and issuing in a direction parallel to said horizontal surface, and means for shortening said first and second cords at equal rates, the length of said first and second cords from said drag device to said cord shortening means being equal, whereby the resultant motion of said drag device is along the path of a true hyperbola having said fixed points as its foci.

5. In a hyperbolograph instrument, a drag device having a stylus for marking its path along a horizontal surface, first and second cords connected to said drag device, a base member, first and second means disposed on said base member for issuing said cords as from a fixed point on said surface, means associated with said base member for positioning said cord issuing means at preselected points along a straight line, a cord shortening means mounted on said base member for shortening said cords at equal rates, said cords passing from said drag device, through said cord issuing means to said cord shortening means, the length of said first and second cords from said drag device to said cord shortening means being equal, and means for positioning said cord shortening device at preselected points along a straight line parallel to said first-mentioned straight line, whereby said drag device moves along the path of a true hyperbola as said cords are shortened, the foci of said hyperbola being disposed at the effective point of issue of said cords from said cord issuing devices and the eccentricity of said hyperbola being determined by the position of said cord shortening device relative to said cord issuing devices.

6. A hyperbolograph instrument as in claim 5, said instrument further comprising first and second tension transferring and indicating means connected in with said first and second cords, respectively, at points adjacent to said drag device, said tension indicating means being adapted to indicate the tension in said first and second cords, respectively.

7. A hyperbolograph instrument as in claim 5 wherein said cord shortening means comprises a single drum formed with first and second adjacent helical grooves on the surface thereof, pulley means for guiding said first and second cords into said first and second grooves respectively, means for rotating said drum and means for moving said drum axially relative to said pulley means as said drum is rotated whereby the position of said cords from said pulley means to the points of contact of said cords with said drum remains unchanged as said cords are shortened.

References Cited in the file of this patent

UNITED STATES PATENTS

| | | |
|---|---|---|
| 1,359,449 | Messinger et al. | Nov. 16, 1920 |
| 2,272,917 | Lawler | Feb. 10, 1942 |
| 2,301,782 | Lawler | Nov. 10, 1942 |
| 2,385,827 | McKaba | Oct. 2, 1945 |

FOREIGN PATENTS

| | | |
|---|---|---|
| 80,797 | Germany | Apr. 24, 1895 |
| 176,676 | Great Britain | Mar. 16, 1922 |

OTHER REFERENCES

"An Instrument for Drawing Confocal Ellipses and Hyperbolas," page 253, American Mathematical Monthly, April 1943 (sketch in 33–27 H).